Patented May 28, 1935

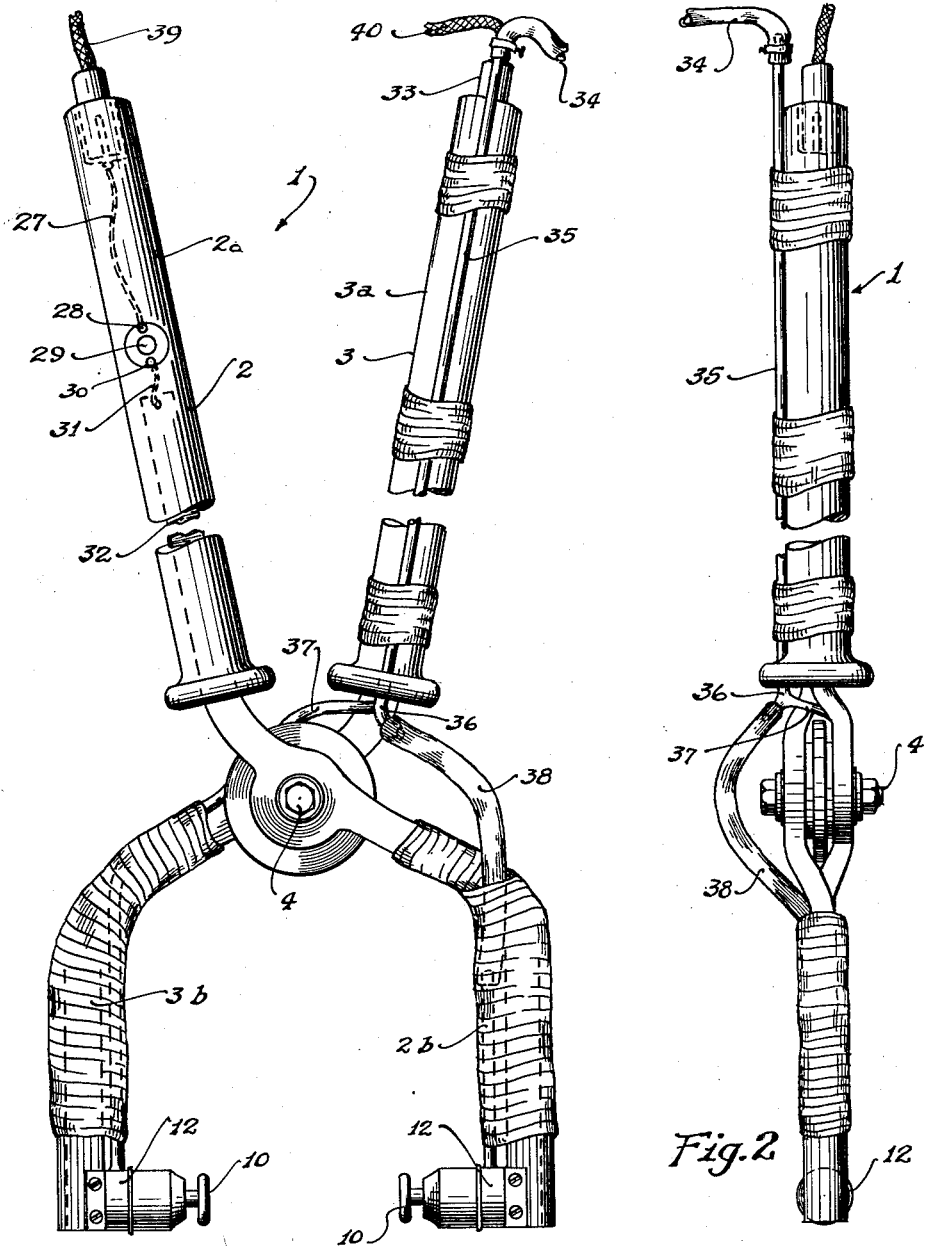

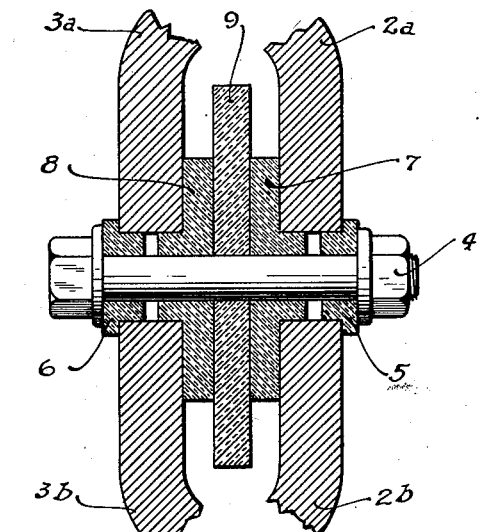
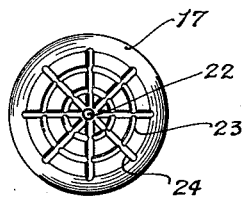
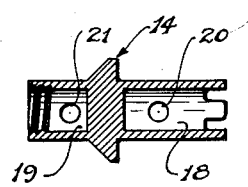
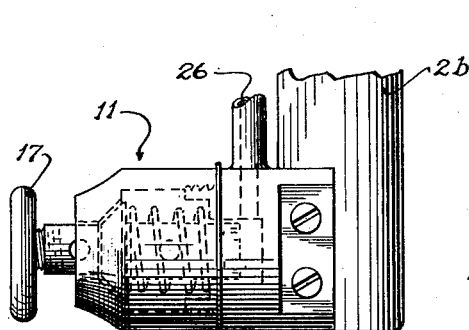
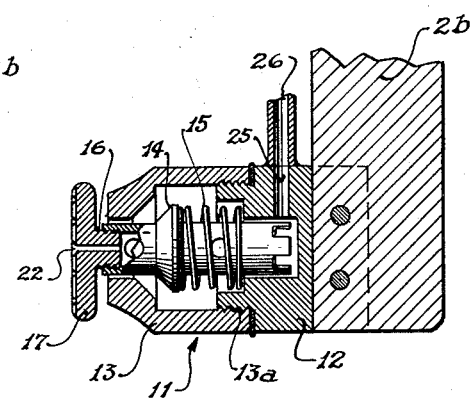
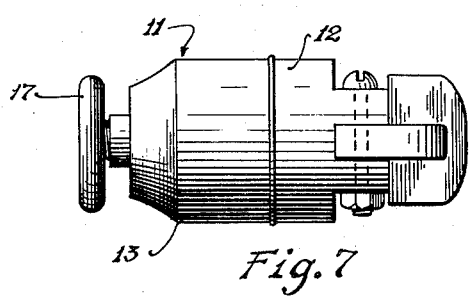

2,002,755

UNITED STATES PATENT OFFICE 2,002,755

STUNNING TONGS

Richard W. Regensburger, Chicago, Ill., assignor, by mesne assignments, to Institute of American Meat Packers, Chicago, Ill., a corporation of Illinois Application November 21, 1933, Serial No. 699,029

15 Claims. (Cl. 175—311)

The invention relates to the stunning of animals, and particularly hogs, before the actual act of killing the same.

The invention relates to an implement or device—in the particular form shown, a pair of tongs—for the electrically stunning of animals preparatory to the actual killing thereof and as an initial act in the operation of slaughtering an animal.

The device is primarily designed for use in the electrically stunning of hogs to render them unconscious a sufficient length of time to permit slaughter. The device, according to the broad aspect thereof, has a construction which provides spaced prongs, forks or jaws at the forward or free end of which there are located electrodes, and in the use of such instrument or device the hog is held, as in a V-shaped trough or in a rack formed, for example, by breaking the continuity of the floor by raising alternate pipes or boards, and while thus held the electrodes of the instrument or stunning tongs are placed in contact with the head of the hog preferably immediately behind the ears, and a charge of electricity is then sent through the hog's brain. It will thus be seen that the invention primarily revolves about an electrical stunning instrument and more particularly about a set of electrical stunning tongs which have been particularly designed for the stunning of hogs but which in fact may be employed for the stunning of other animals. The electric current which is passed from one electrode to the other and thus through the brain of the animal when the instrument is applied for affecting a stunning operation, should be of a character to effect the stunning of the animal but it should not be of a character to effect the outright killing of the same.

According to the preferred form of the invention, the instrument has a handle portion at the forward end of which there are located the spaced jaws or tongs and wiring or other conductor extends along the handle by means of which the electricity is passed through the electrodes, and suitable switch means is also preferably provided on the handle whereby the operator can switch on and off the current without releasing his hold on the handles.

It has been ascertained that the dry hair of an animal provides an insulating effect, and in order to overcome the uncertainty of operation incident to such poor electrical contact, it is necessary to wet the hairs of the animal at the place where the electrodes are applied. In other words, it becomes practically necessary to provide a moist or wet contact between the electrodes and the fleshy part of the animal.

Having in mind this requisite, another aspect of the invention revolves about the employing of a liquid supply, such as brine, which is conducted to the electrodes through suitable piping also preferably connected to and constituting a part of the stunning instrument.

According to another preferred aspect of the invention, the electrodes have an opening extending therethrough, they having valves associated therewith, and each extends into a socket portion into which the brine is delivered and from which the brine can pass to and through the electrodes when the valves controlled by the electrodes are opened. The construction is preferably such that the application of the electrodes to the animal's head with the concomitant pincher or pressing action of the electrodes operates to open the valves whereby the liquid flow can take place. The liquid flow may also be controlled by a valve on the handle of the tongs instead of by valves in the electrodes.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

Reference will now be made to the drawings forming a part of this specification, and in which Figures 1 and 2 are respectively face and side views of a set of stunning tongs which provide an instrument for realizing the invention.

Fig. 3 is a cross sectional view through the pivotal connection of the two main members of the stunning tongs of Figs. 1 and 2.

Fig. 4 is a view of an electrode construction showing its mode of mounting and connection to the free or forward end of the pincher jaw to which it corresponds on the tongs.

Fig. 5 is a sectional view of the electrode construction shown in Fig. 4.

Fig. 6 is a sectional view of the valve which is associated with or which constitutes a part of the electrode.

Fig. 7 is a view of the electrode as it appears to one positioned in front of the tongs and looking at the forward or free ends of the pincher jaws thereof.

Fig. 8 is a view of that portion of the electrode which directly engages the flesh of the animal.

Reference will now be made to the drawings in detail. The stunning instrument or device which in Figs. 1 and 2 is shown as in the form of a set of stunning tongs, is broadly designated by 1 and it comprises the members 2 and 3 which are pivotally connected through the medium of the connecting bolt 4 (see Figs. 1, 2 and 3) and which connecting bolt 4 is insulated from the pivoted members 2 and 3 through the medium of insulating washers 5 and 6, the separating washers 7 and 8 and the still further insulating disk 9, all as shown in Fig. 3, whereby any short circuiting of electrical current through this joint is prevented.

The pivoted members 2 and 3 provide handle portions as 2a and 3a and corresponding jaw portions as 2b and 3b. The portions 2a and 3a may be considered as providing a handle for the instrument as a whole from the free end of which there forwardly extend the jaws which in effect provide spaced forwardly extending prongs. These jaws or prongs carry at the forward end thereof electrodes 10 through which the electricity for stunning the animal is suitably supplied as will hereafter more clearly appear. The construction of each of these electrodes is the same and is clearly illustrated in Figs. 4 to 8, inclusive. A reference to these figures will show that a socket member construction 11 is employed, which construction comprises a body portion 12 that is fixedly secured to the free or forward end of the jaw or prong to which it corresponds, and that there is a hollow cap portion 13 which has a screw threaded connection at 13a to the body portion 12.

A valve 14 is located within this hollow cap portion 13, such as is indicated in dotted lines as shown in Fig. 4, said valve being normally pressed against the socket member by closing means such as a spring 15, and of course to a certain extent by the pressure of the fluid between the valve and socket and tending to close it.

The forward end of the valve is connected through the medium of a screw threaded connection 16 to the electrode tip proper 17. This valve member 14 has cavital portions 18 and 19 on opposite sides of the valve element proper and it also has openings 20 and 21 for permitting the flow of brine therethrough, as will be hereafter described. The electrode tip 17 has an opening 22 therethrough and serrated or grooved portions 23 and 24, whereby brine passing through the opening 22 can be distributed over and along the entire face or flesh-engaging portion of the electrode tip. The body portion 12 of the electrode construction has an opening 25 into and through which brine, as through a supply pipe 26, is passed, whereby the brine thus supplied when the valve is opened can pass into the cavital portion 18, thence through the opening 20, past the open valve, then through the opening 21 into the cavity 19, and therefrom through the opening 22 and the grooves 23 and 24 for providing the wetting action desired. It will be seen that this wetting action follows a pressing of the electrode towards and into the socket portion of the member, and that the brine flow is automatically stopped upon the release of the electrode, upon disengagement from the flesh of the animal.

The electrode tip member proper and the forward portion of the valve element may be considered as collectively constituting the electrode member, which in turn serves to position the valve element proper.

Referring now to Figs. 1 and 2, it will be seen that the main portion of the handles of the tongs is provided with insulating material, and that leading in and leading out wires 39 and 40, respectively, extend into and from the insulated and conducting portion of the handles. Leading in wire 39 is suitably connected as through the wires 27 with one terminal 28 of a switch 29, while the other terminal 30 of the switch is suitably connected as by wire 31 with a metallic portion 32 which is integral with the jaw or prong construction corresponding thereto, whereby the electricity when the switch is closed can flow through the said metallic portion 32 and the jaw into and through the electrode corresponding thereto, since the main operating parts are metallic.

The leading out wire 40 is connected to a tip or end 33 which is integral with the metallic part of the handle portion 3a, whereby there is provided a continuous electrical connection between the electrode 10 which corresponds to the jaw 3b and the electric supply or to the ground leading back to the source of electrical supply.

The stunning tongs or instrument also has a tube or flexible pipe 34 that leads from a suitable brine or other liquid supply. This pipe 34 is in turn connected as to a suitable piping as 35 having branches as 36 and 37. The branch 37 extends along the tong member or jaw 3b and is of a length to reach the body portion 12 corresponding to the clamping jaw 3b, whereby the brine can be supplied to the electrode on that jaw. The other branch 36 is shorter than the branch 37 and is connected with a flexible tubular member 38 which extends from the branch to the body portion 12 that is on and corresponds to the jaw 2b. These pipes may be of metal or any other suitable material to withstand the action of the brine.

In the application of the instrument for use in stunning animals, it will be apparent that the instrument is preferably applied so that it spans a particular portion of the animal to be stunned, whereby the electrodes engage spaced opposite sections of the animal, as, for example, the fleshy sections of the head immediately behind the ears, whereby the charge of electricity passing from one electrode to the other will pass through the brain of the animal. The current used in such an instrument is preferably a direct current with a voltage of from 60 to 100, and having interruptions of from 6,000 to 12,000 per minute. Below 60 volts the current will not stun, while above 115 volts serious injury may result from the severity of the shock. A satisfactory current in practice is 8,000 interruptions per minute, a voltage of 78, and an amperage of 10–90, and with a contact time of four seconds.

I claim:

1. An instrument for electrically stunning animals, which instrument comprises a pair of spaced prongs each of which is provided with a flesh engaging electrode, a leading in wire connected to one of said electrodes, a leading out wire connected to the other electrode, a switch carried by the handle portion for opening and closing at will to control the flow of current from one electrode to the other, and tubular piping for supplying brine to said electrodes.

2. An instrument as defined in and by claim 1, according to which each prong carries a socket member into which the electrode corresponding thereto extends, within each socket a valve which normally closes the passageway leading from said socket member to said electrode, but which is opened incident to the pressing of the electrode into the socket member.

3. A pair of stunning tongs to the free end of each pincher jaw of which there is provided a yieldable flesh engaging electrode that extends into a socket portion and which is connected to a valve normally closing a passageway leading from the interior of the socket portion to and through a passageway through the electrode, a leading in wire electrically connected to one of the electrodes, a leading out wire electrically connected to and leading from the other electrode, a switch in the handle portion of the tongs positioned so as to be opened and closed by the hand of the operator while on the tongs, whereby the flow of electric current to and through the electrode is controlled according to the position of said switch, and piping leading to the hollow socket portions at the free end of the pincher jaws and through which piping brine is supplied that passes to and through the electrodes when the electrodes are pressed back into the socket portions incident to the pinching of the flesh of the animal between the electrodes of the tongs.

4. In a stunning instrument an electrode, a socket portion within which a valve is located and into which a portion of the electrode extends so as to control the actuation of said valve, a spring normally pressing the valve to closed position, and a brine supply conduit leading to the interior of said socket portion, said electrode being constructed so that when forced inwardly in respect to the socket portion it causes the valve to move from closed position, whereby there follows a flow of brine past the valve into and through the electrode.

5. An instrument for electrically stunning animals comprising a pair of spaced prongs, a valve device carried by each prong and including a socket member and an internal normally closed valve member, an electrode secured to each valve member and having a discharge aperture therein leading from the respective socket member, a leading in wire connected to one of said electrodes, a leading out wire connected to the other electrode, a switch carried by the instrument for opening and closing at will to control the flow of current from one electrode to the other.

6. An instrument for electrically stunning animals comprising a pair of spaced prongs, a valve device carried by each prong and including a socket member and an internal normally closed valve member, an electrode secured to each valve member and having a discharge aperture therein leading from the respective socket member, a leading in wire connected to one of said electrodes, a leading out wire connected to the other electrode, a switch carried by the instrument for opening and closing at will to control the flow of current from one electrode to the other, each valve device having an opening leading to the interior of the respective socket member, and piping for supplying brine to the electrodes through the piping and the respective socket members when the valves are opened.

7. An instrument for electrically stunning animals comprising spaced members movable toward and away from each other, a valve device carried by each of said members including a socket member and an internal normally closed valve member, an electrode secured to each valve device and slidable relatively to the respective socket member to open the respective valve member, a leading in wire connected to one of said electrodes, a leading out wire connected to the other electrode, and a switch carried by the instrument for opening and closing the same at will to control the flow of current from one electrode to the other.

8. An instrument for electrically stunning animals comprising spaced members movable toward and away from each other, a valve device carried by each of said members including a socket member and an internal normally closed valve member, an electrode secured to each valve device and slidable relatively to the respective socket member to open the respective valve member, a leading in wire connected to one of said electrodes, a leading out wire connected to the other electrode, a switch carried by the instrument for opening and closing the same at will to control the flow of current from one electrode to the other, each electrode having an opening therein leading from the respective socket, and tubular piping communicating with the interior of the socket members to supply brine to the socket members and to the electrodes through the openings in the latter when the respective valves are open.

9. An instrument for electrically stunning animals comprising a pair of members, socket members secured to said members, a spring controlled normally closed valve in said socket members, an electrode detachably secured to each valve member and having an opening for the passage of fluid therethrough from the respective socket members, means whereby to supply electric current to said electrodes through the animal when the electrodes are engaged with the flesh of the animal, a switch to operatively cut in and cut out the supply of electric current to the electrodes, and means for supplying brine to the interior of the socket members for passage therefrom through the openings in the electrodes.

10. An instrument of the character described comprising a pair of members movably connected together intermediate their ends, providing a pair of spaced prongs and a pair of handle members arranged on opposite sides of said movable connecting means, a socket member secured to the outer end of each prong and each socket member having a valve seat and also having an inlet opening, a valve member disposed in each of the socket members and having inner and outer cavital end portions, each cavital portion having communication with the respective socket member, spring means for maintaining said valve member normally in engagement with the seat of the respective socket member, a flesh engaging electrode connected to and carried by each of said valve members and having a central aperture leading outwardly therethrough from the outer cavital portion of the respective valve member, each electrode having a grooved outer face with said grooves leading from the aperture of the respective electrode, a leading in wire connected to one of said electrodes, a leading out wire connected to the other electrode, a switch carried by one of the handle portions for opening and closing at will to control the flow of current from one electrode to the other, and tubular piping for supplying brine to said socket members by way of the inlet openings of the latter, the brine being removable from the socket members from the respective inner cavital portions of the respective valve members to the respective outer cavital portions of the valve members and through said electrode openings to the grooves of the electrodes when the electrodes move inwardly against said spring means incident to pressure of the electrodes against the flesh of the animal.

11. An instrument for electrically stunning animals comprising a pair of spaced members movable toward and away from each other, a valve device carried by each member and including a socket member and an internal normally closed movable valve member, means for exerting outward pressure on the valves to maintain them normally closed, an electrode secured to each valve member at the outer end thereof, a leading in wire connected to one of said electrodes, a leading out wire connected to the other electrode, and a switch carried by the instrument for opening and closing at will to control the flow of current from one electrode to the other.

12. An instrument for electrically stunning animals comprising a pair of spaced members movable toward and away from each other, a valve device carried by each member and including a socket member and an internal normally closed movable valve member, means for exerting outward pressure on the valves to maintain them normally closed, an electrode secured to each valve member at the outer end thereof, a leading in wire connected to one of said electrodes, a leading out wire connected to the other electrode, a switch carried by the instrument for opening and closing at will to control the flow of current from one electrode to the other, each electrode having an opening therein, means for supplying brine to the socket member of the valve device for passage through and application to the electrodes when the valve devices move inwardly against said pressure means incident to pressure of the electrodes against the flesh of the animal.

13. An instrument for electrically stunning animals comprising a pair of pincher tongs provided with handles and with opposed cooperative electrodes, means for supplying electrical current to such electrodes, and means for supplying liquids to such electrodes.

14. An instrument for electrically stunning animals comprising a pair of pincher tongs provided with handles and with opposed cooperative electrodes, means for supplying electrical current to such electrodes, means for supplying liquids to such electrodes, and means for controlling the supply of said liquid to said electrodes.

15. In an instrument of the class described, electrodes provided with an aperture communicating with a liquid supply, and grooves on the contact surface of said electrodes communicating with said aperture.

RICHARD W. REGENSBURGER.